United States Patent [19]

Wiese et al.

[11] Patent Number: 5,156,247
[45] Date of Patent: Oct. 20, 1992

[54] CONNECTABLE OR DISCONNECTABLE VISCOUS COUPLING

[75] Inventors: Helmut Wiese, Neunkirchen-seelscheid; Paul-Erich Schönenbrücher, Much-Kranüchel, both of Fed. Rep. of Germany

[73] Assignee: Viscodrive GmbH

[21] Appl. No.: 584,759

[22] Filed: Sep. 19, 1990

[30] Foreign Application Priority Data

Sep. 22, 1989 [DE] Fed. Rep. of Germany ....... 3931618

[51] Int. Cl.⁵ .................. F16D 21/08; F16D 27/10; F16D 47/02; B60K 23/08
[52] U.S. Cl. .................. 192/48.2; 192/48.5; 192/57; 192/71; 192/84 AB; 192/84 T; 180/248
[58] Field of Search .................. 192/48.2, 48.5, 57, 192/58 B, 84 AB, 71, 84 T; 180/248

[56] References Cited

U.S. PATENT DOCUMENTS

| 1,671,057 | 5/1928 | Brainard | 192/84 AB |
| 2,101,366 | 12/1937 | Frank | 192/71 |
| 2,375,781 | 5/1945 | Gilfillan | 182/84 AB X |
| 2,498,399 | 2/1950 | Dodge | 192/71 |
| 2,621,494 | 12/1952 | Cross | 192/71 X |
| 3,446,322 | 5/1969 | Wrensch | |
| 4,885,957 | 12/1989 | Taureg et al. | 192/57 X |
| 4,899,859 | 2/1990 | Teraoka | 192/57 X |
| 4,966,265 | 10/1990 | Wiese et al. | 192/48.2 X |

FOREIGN PATENT DOCUMENTS 3707115 9/1987 Fed. Rep. of Germany.
3708193 10/1987 Fed. Rep. of Germany.
3822115 1/1989 Fed. Rep. of Germany.

Primary Examiner—Rodney H. Bonck
Attorney, Agent, or Firm—Toren, McGeady & Associates

[57] ABSTRACT

A viscous coupling for a motor vehicle which may be connected or disconnected under load and which, in a reliable and interference-free way and with a short delay time, selectively permits the transmission or interruption of the driving force relative to the wheels of the rear and/or front axle, including a locking ring which is axially movable between two switching positions and may be moved into one of the two switching positions against the returning force of a spring by a force-actuated setting member which includes a firmly connected annular tongue which consists of a low-remanence ferromagnetic material and which may be transferred in an annular gap selectively loaded with a magnetic flow and formed by a soft iron core, with the axial length of the annular gap being greater than or equal to the axial distance covered by the setting member between the two switching positions.

11 Claims, 4 Drawing Sheets

CONNECTABLE OR DISCONNECTABLE VISCOUS COUPLING

BACKGROUND OF THE INVENTION

The invention relates to a switching coupling (1a) for a connectable or disconnectable viscous coupling (1b), which serves to distribute the driving torque between the driving axles and/or wheels of a motor vehicle, and includes a hollow shaft (17), a shaft journal (19) coaxially supported therein, radially movable locking elements (24) which are held in guiding apertures (22) of the hollow shaft (17) so as to be circumferentially fixed, but radially movable, which cooperate with corresponding engaging recesses (23) in the shaft journal which are axially associated with the guiding apertures (22) in the hollow shaft (17) and which may be engaged by the locking elements (24) for non-rotatingly connecting the hollow shaft (17) to the shaft journal (19), as well as having a locking ring (24) which, to a limited extent, is axially movable on the hollow shaft (17) and which comprises a contact face for radially displacing the locking elements (24) inwardly and a blocking face for holding the locking elements (24) while simultaneously engaging the hollow shaft (17) and shaft journal (19).

Disconnectable couplings, especially viscous couplings, are used in the driveline of four wheel drive vehicles to have the option of engaging the second axle when special operating conditions prevail, for instance, in the case of bad traction or slip at the permanently driven axle or for disconnecting the second axle under certain operating conditions to ensure driving stability and error-free functioning of an anti-blocking system.

A coupling of this type is known from DE 38 22 115 A1, in which the force-transmitting mechanism consists of a claw coupling, with the axially displaceable claw sleeve being locked via spherical locking elements which engage a groove in the respective hollow shaft and which, via a locking sleeve, are held radially against the tooth force of the claw coupling. These couplings are hardly suitable for connecting and disconnecting purposes under load.

From DE 37 07 115 A1, it is known to preload a limited slip differential axle with a variable friction resistance via an electromagnetic control device, thus providing the driver with a pre-setting for different road conditions. Because of the existing friction damage, this assembly is subject to increased wear, and its control device does not permit the short switching times such as are required for a four wheel drive vehicle with an anti-blocking system.

SUMMARY OF THE INVENTION

Accordingly, it is an object of the present invention to provide a viscous coupling for a motor vehicle, which may be connected or disconnected under load and which, in a reliable and interference-free way and with a short delay time, selectively permits the transmission or interruption of the driving force relative to the wheels of the rear and/or front axle.

Pursuant to this object, and others which will become apparent hereafter, one aspect of the present invention resides in a locking ring, that is axially movable between two switching positions, which may be moved into one of two switching positions against the returning force of a spring by a force actuated setting member. The setting member comprises a firmly connected annular tongue which consists of a low-remanence ferromagnetic material and which may be transferred in an annular gap selectively loaded with a magnetic flow and formed by a soft iron core, with the axial length of the annular gap being greater than or equal to the axial distance covered by the setting member between the two switching positions.

The locking ring is supported by a blocking element in a position into which it was transferred by the setting member in order to ensure that a small amount of force applied to the setting member is sufficient for holding the locking ring against the spring force.

The annular gap formed by the soft iron core loaded by a magnetic flow and the annular tongue at the setting member ensure a constant attraction force via the entire axial path of the setting member on the hollow shaft, with the annular tongue being able to rotate freely in the annular gap while remaining at a distance from the soft iron core at both ends.

According to one embodiment of the invention, the magnetic flow may be produced by an electromagnet designed as an annular magnet attached to the hollow shaft so as to be stationary. The annular magnet comprises two magnetic windings which have the same number of turns and the same wire diameter and with the magnet windings being suitable for being switched between a parallel and series connection by a switching assembly.

The coil of the annular magnet consists of two parts to ensure that the magnetic flow generated by the annular magnet may be varied and to achieve a higher through-flow rate during the switching process due to the parallel connection.

In a further embodiment of the invention it is proposed that during the attraction phase of the annular tongue, the magnetic windings should be switched in parallel for a maximum period of half a second and that for holding the locking ring against the returning force of the spring, the magnetic windings should be connected in series.

During a first attraction phase, both windings are connected in parallel with a high attraction moment and in a subsequent holding phase, they are connected in series in order to reduce the current. Because the switching assembly allows the magnetic windings to be switched rapidly, it is possible, simultaneously, to prevent overloading of the coil windings, which temporarily may exceed several 100%.

According to a further embodiment of the invention, the locking ring is directly connected to the setting ring and is held, via a spring, in the blocking position for the locking elements on the hollow shaft at an end facing away from the annular magnet and, upon loading of the annular magnet, the locking ring may be transferred into the releasing position, with the blocking position being secured by additional blocking means against any vibrations.

This design permits the viscous coupling to be engaged in the unloaded condition of the annular magnet and ensures continued driving of the shaft journal if the control circuit for the annular magnet fails. This design is particularly advantageous for off-highway vehicles because high traction forces are achieved.

This embodiment has a further advantage in that the switching function is carried out by a single axially movable part and that it is insensitive to interference. Furthermore, there is no need for rotating parts, via additional bearings, to be supported relative to fixed parts.

According to another embodiment of the invention, in the releasing position, the locking ring is held by the returning force of the spring. By loading the annular magnet, the locking ring, via an associated securing ring, may be transferred indirectly by the setting ring into the blocking position. The first magnetic winding is provided with a larger wire diameter while having a smaller number of turns, with the second magnetic winding being provided with a smaller wire diameter while having a larger number of turns. In the blocking position, it is only the returning force of the auxiliary spring acting on the setting member which is decisive for the holding force of the annular magnet, with the locking ring being lockable via blocking means. For switching into the releasing position, the locking ring is transferable through axial displacement of the securing ring as a result of the returning force of the auxiliary spring for releasing the blocking ball and through the returning force of the spring.

This alternative design ensures that the viscous coupling is engaged in the loaded condition of the annular magnet and that, should the control circuit for the annular magnet fail, the shaft journal is released.

Among other things, this viscous coupling design makes it possible, if used as a viscous transmission in the longitudinal driveline of a motor vehicle with four wheel drive, to switch the vehicle from four wheel drive to two wheel drive when actuating the vehicle brake and the control function of an anti-blocking device. In this way it is possible to avoid the familiar difficulties occurring when braking four wheel drive vehicles.

Additionally, if using this viscous coupling design as a viscous transmission, it is ensured that, in the case of interference, the rear axle is disengaged, thereby providing a "fail safe" mechanism for standard operational conditions.

According to a further embodiment of the invention, the electric switching assembly consists of an input transistor passing a negative pulse plank to an IC timer via a condenser, a time-determining R-C member associated with the IC timer and a connected power transistor for controlling one or several relays. This switching assembly achieves a short switching time which, depending on the desired function of the viscous coupling, permits immediate connection or disconnection of the wheels or axles.

In a preferred embodiment of the invention, the blocking means are held in an aperture of the locking ring so as to correspond, radially movably, to an annular groove in the hollow shaft, with the switching coupling being in an engaged and/or disengaged position. For axially securing the locking ring, the blocking means engage the annular groove of the hollow shaft.

The blocking means permit the locking ring to be locked relative to the hollow shaft in the loaded condition of the annular spring and ensure a reduction in the holding force of the annular magnet.

In a further embodiment of the invention it is proposed that the blocking means should consist of at least one spring-loaded engaging ball.

As a result of this advantageous design, the locking ring is secured via the engaging ball on the hollow shaft by means of a low spring force, if the coupling is in the locked condition.

According to yet another embodiment of the invention, the blocking means comprise at least one blocking ball and one securing ring with a cylindrical contact face for radially displacing the blocking ball inwardly as well as a second cylindrical blocking face for holding the blocking ball in the annular groove of the locking ring.

In this alternative embodiment, the locking ring is locked in the annular groove of the hollow shaft by at least one blocking ball, with the blocking ball and the securing ring holding the locking ring against the force of the strong helical spring in the locked condition.

According to one feature of the invention, the switching coupling is used together with the viscous coupling between two axles of a motor vehicle for the purpose of loading one of the two axles with a torque.

According to a further feature of the invention, the switching coupling is used together with the viscous coupling for the purpose of effecting limited locking of the intermediate axle differentials and/or intermediate wheel differentials.

Because of the compact design of the viscous coupling with its integrated switching coupling, no problems are encountered in incorporating it in the front or rear axle differential drive as well as in the driveline between the front and rear axle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF PREFERRED EMBODIMENTS

Figure 1:
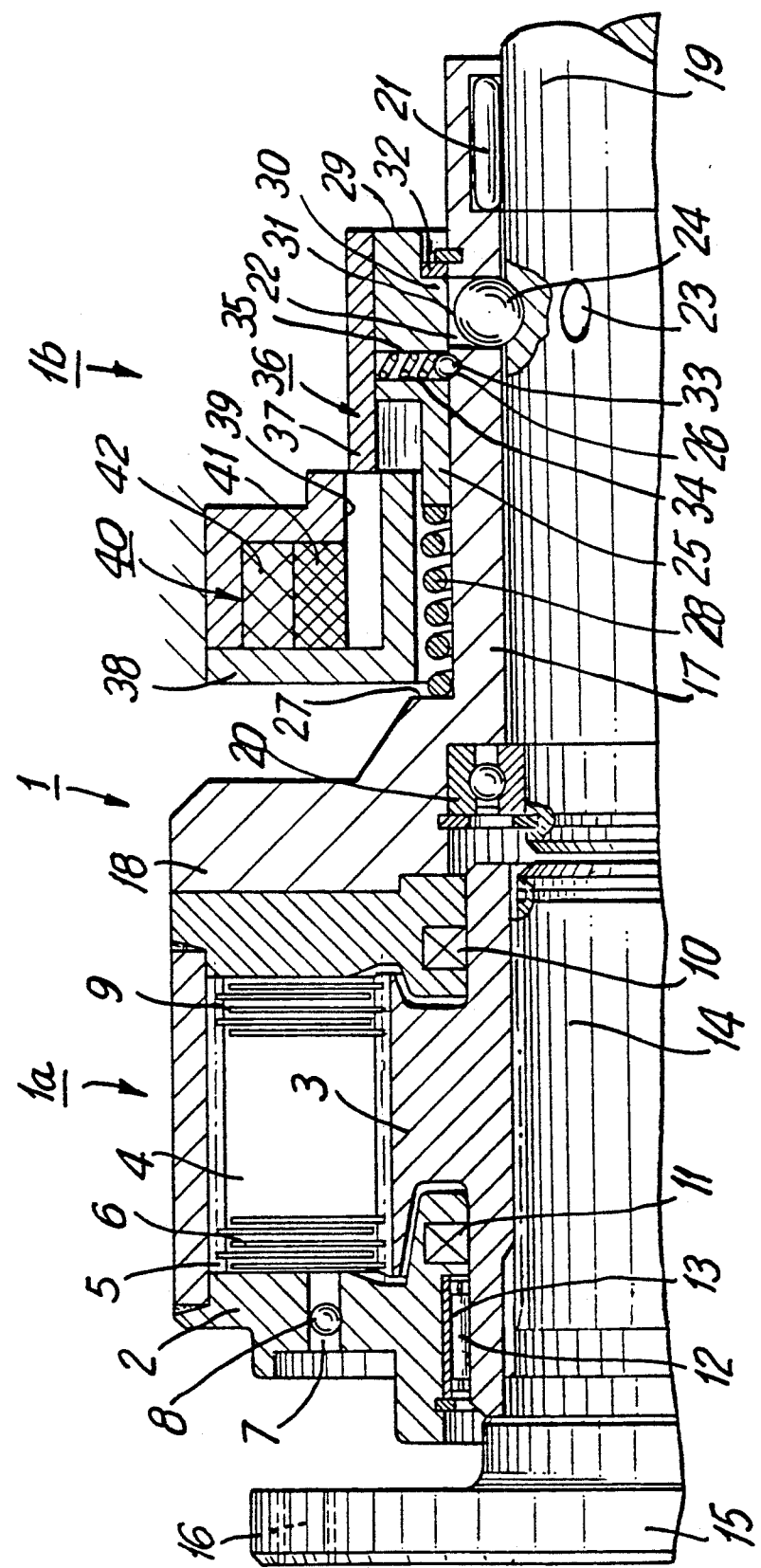
FIG. 1 is a section of a disconnectable viscous coupling having ball/spring locking means pursuant to the present invention.
Figure 2:
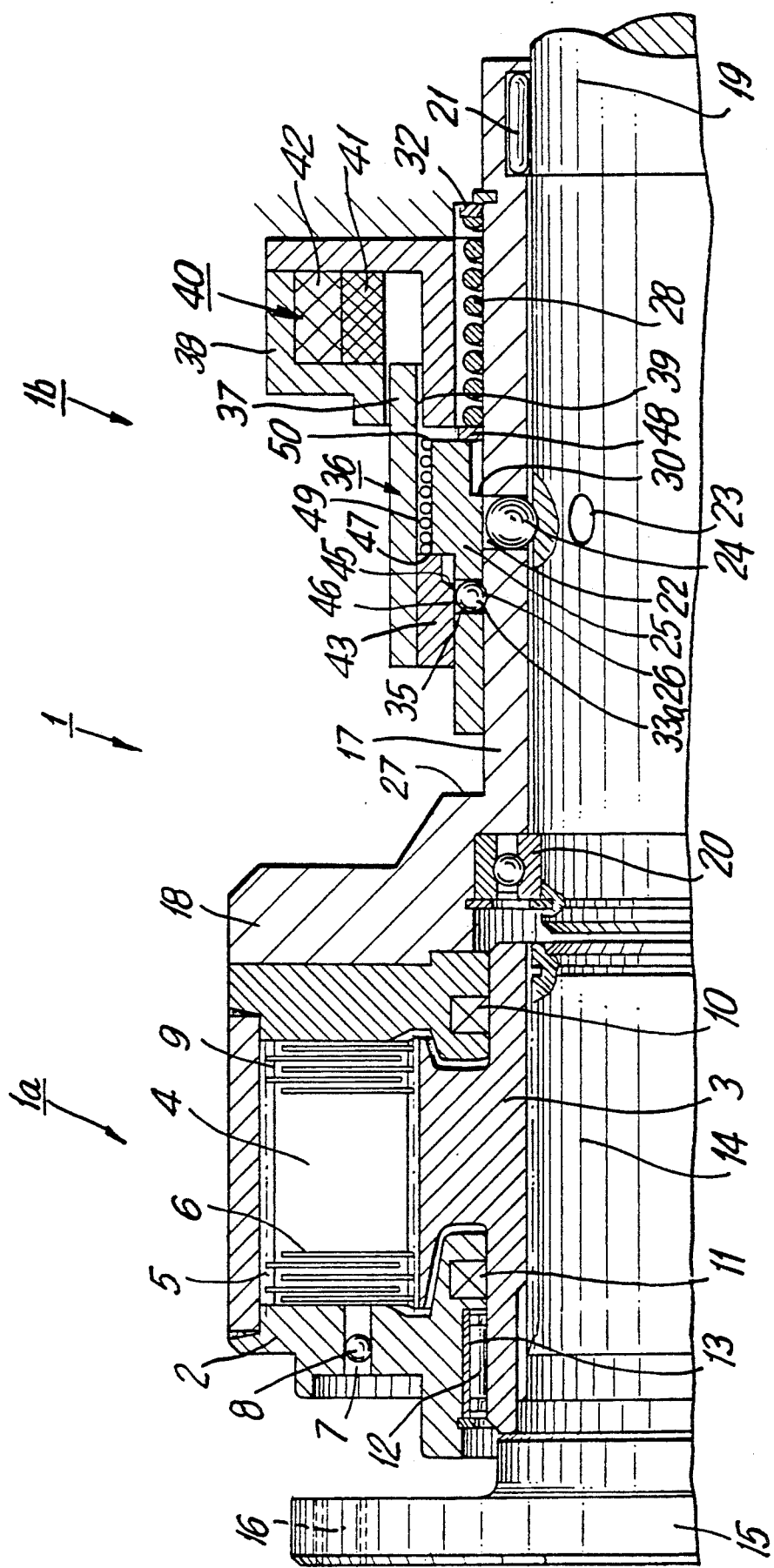
FIG. 2 is an illustration according to FIG. 1, where locking is achieved via a blocking ball and a securing ring.

The drive assembly 1 shown in FIGS. 1, 2 consists of a viscous coupling 1a and a switching coupling 1b having a coupling housing 2, a coupling hub 3 rotatably supported in the coupling housing 2 and a free space 4 provided between the coupling hub 3 and the coupling housing 2. Outer plates 5 non-rotatingly connected to the coupling housing 2 and inner plates 6 non-rotatingly connected to the coupling hub 3 are arranged in the free space 4 so as to alternate. The remaining free space 4 is at least partially filled with a viscous fluid, for example, silicone oil. After having been filled through a filling channel 7, the coupling housing 2 is sealed by a locking ball 8. The outer plates 5 are spaced uniformly by axial spacing rings 9. The free space 4 is sealed relative to the outside by seals 10, 11 and the coupling hub 3 is supported relative to the coupling housing 2 by a bearing 12 in a radial bearing recess 13.

The end of a shaft journal 14 comprises a formed-on connecting flange 15 with fixing bores 16 and is fixed in the coupling hub 3.

The switching coupling 1b having a hollow shaft 17 is connected to the coupling housing 2 and the viscous coupling 1a via a flange 18, with a second shaft journal 19 being rotatably supported in the hollow shaft 17 via roller bearings 20, 21. The hollow shaft is provided with guiding apertures 22 which correspond to engaging recesses 23 in the second shaft journal 19. The guiding apertures 22 of the hollow shaft 17 hold locking elements, especially locking balls 24 which, in the locking position, engage the engaging recesses 23 of the second shaft journal 19. The balls 24 are held in the locking position by a locking ring 25, with the locking ring 25, in turn, being secured in the locking position by blocking means engaging an annular groove 26 of the hollow shaft 17.

In FIG. 1, the locking ring 25 is held in the locking position by a helical spring 28, one end of which is supported on a stop 27 of the hollow shaft 17, and its other end resting against the locking ring 25. At its end 29 facing away from the helical spring 28, the locking ring 25 is provided with an increased internal diameter having a conical contact face 30 and a blocking face 31, with the increase in the internal diameter corresponding to at least the depth of the engaging recess 23 for the locking ball 24. A stop ring 32 of the hollow shaft 17 limits the axial movement of the locking ring 25. The locking ring 25, via its apertures 35, is held in the locking position by several blocking components uniformly distributed across the circumference of the hollow shaft 17, especially at least an engaging ball 33 with a spring 34.

The locking ring 25 is connected to a setting member 36 which is made of a low-remanence ferromagnetic material, which is provided with an annular tongue 37 and cooperates with an annular gap 39 which is formed by a soft iron core 38 and is associated with a stationary annular magnet 40. The annular magnet 40 is preferably provided with two windings 41, 42 which, in a first attraction phase, for unlocking the viscous coupling 1, are switched in parallel to ensure that a high attraction force combined with a short switching time is applied to the annular tongue 37. As a result of the attraction force of the annular magnet 40, the locking ring 25, against the force of the helical spring 28, is pulled into the unlocked position and, in a second holding phase, the windings 41, 42 are switched in series so that the locking ring 25, against the force of the helical spring 28, is held in the unlocked position by a reduced attraction force of the annular magnet 40. The windings 41, 42 may have the same number of turns and the same wire diameter, but they may also have different designs.

With the embodiment illustrated in FIG. 2, the locking ring 25 holds a securing ring 43 which is directly connected to the setting member 36 and which, while being pulled by the annular tongue 37 into the annular gap 39 of the soft iron core 38, is held on the locking ring 25. The securing ring 43 comprises an annular recess 44 having a conical contact face 45 and a blocking face 46. In the aperture 35 of the locking ring 25, an engaging ball 33a is supported in the annular groove 26 of the hollow shaft 17 and held by the blocking face 46 of the securing ring 43. With one edge 47, the securing ring 43 rests against the locking ring and is held, against the spring force of the helical spring 28, by the engaging ball 33 positioned in the annular groove 26 of the hollow shaft 17. The helical spring 28 is held on the hollow shaft 17 between the stop 48 of the locking ring 25 of the hollow shaft and the stop of the securing ring 43, with an auxiliary spring 49 being clamped in between the securing ring 43 and a stop 50 of the locking ring 25.

In the course of a first phase, when loading the annular magnet 40, the annular tongue 37, with the connected securing ring 43, indirectly via the engaging balls 33a, pulls the locking ring 25 against the force of the helical spring 28 into the locking position and rests against the locking ring 25 as soon as the engaging balls 33a have dropped into the annular groove 26 of the hollow shaft 17. The engaging balls 33a are blocked in the annular groove 26 of the hollow shaft 17 by the securing ring 43 and accommodate the force of the helical spring 28. To uphold the locking position, the annular magnet 40, in a second phase, holds the securing ring 43 only against the force of the effective auxiliary spring 49 between the locking ring 25 and the securing ring 43. With this embodiment, too, the coil of the annular magnet is preferably designed in two parts; in a first phase, the two windings are connected in parallel and in a subsequent phase they are connected in series.

In the unloaded condition of the annular magnet 40, the securing ring 43 is pushed back from the region of the guiding apertures 35 of the locking ring 25, thereby enabling the engaging balls 33a to escape from the annular groove 26 provided in the hollow shaft 17, with the force of the helical spring 28 pushing back the locking ring 25 from the locking position for the locking balls 24, as a result of which the torque connection between the hollow shaft 17 and the second shaft journal 19 is interrupted.

Figure 3:
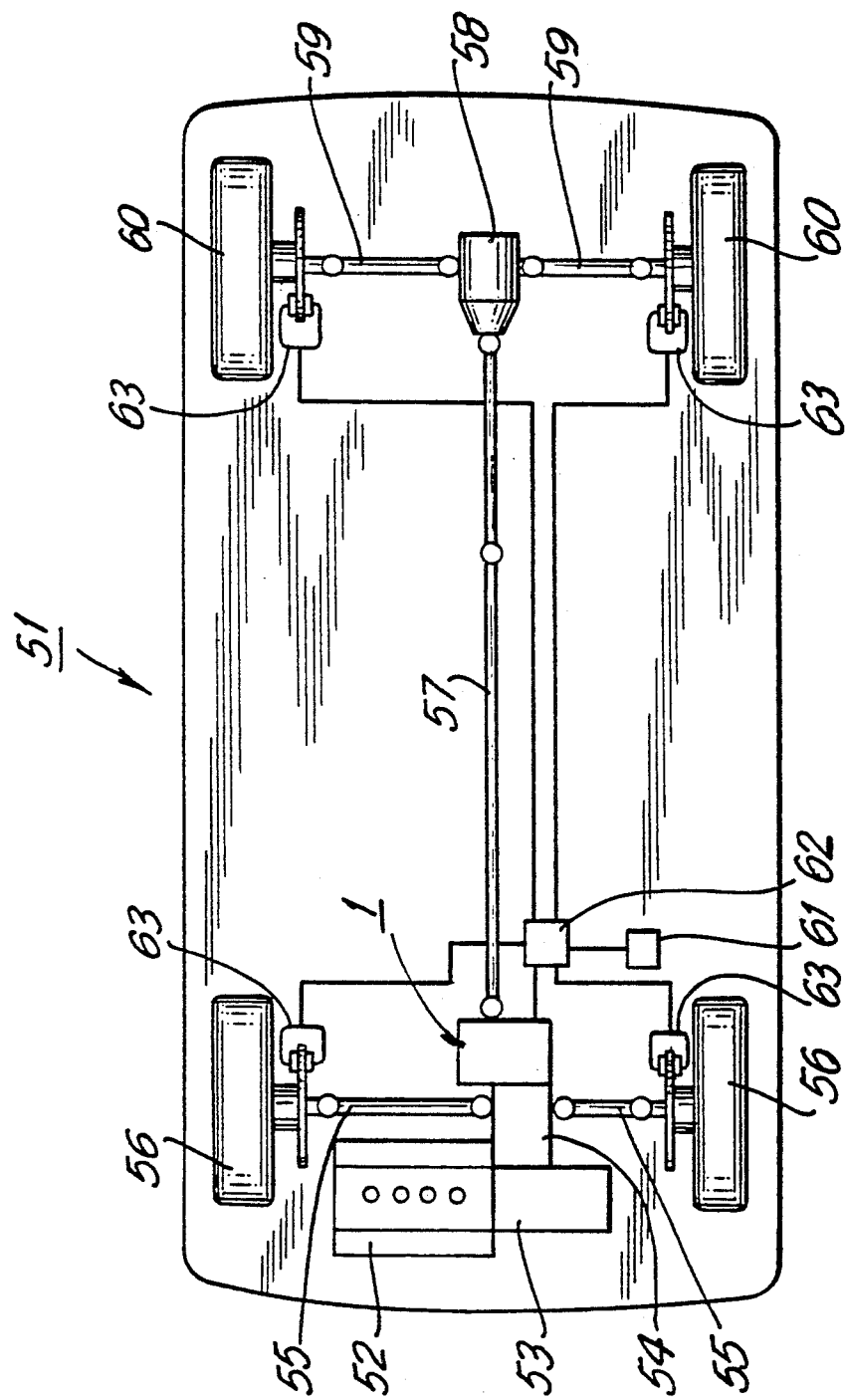
FIG. 3 shows a two wheel drive vehicle with a drive assembly for the rear axle.

FIG. 3 shows a four wheel drive vehicle 51 whose engine 52 is connected to driven front wheels 56 via a manual gearbox 53, a front axle differential 54 and front halfshafts 55. Additionally, the drive for the rear axle is branched off from the front axle differential 54 via a propeller shaft 57. The propeller shaft 57 accommodates, for example, a drive assembly 1 comprising a viscous coupling 1a and a switching coupling 1b which are connected to halfshafts 59 of the rear wheels 60 via a rear axle differential 58.

Part of the drive assembly 1 is a viscous coupling 1a with a switching coupling 1b, as illustrated in FIG. 2. If only one viscous coupling 1a were provided, there would be a risk in that whenever the permanently driven front wheels 56 were blocked by applying the brake pedal 61, for example, the rear wheels 60 would be transferred into the blocked condition via the viscous coupling 1a, as a result of which the rear wheels 60 would lose their lateral stability and the vehicle could break out.

This is the reason why the viscous coupling 1a is associated with a switching coupling 1b actuated via a control device 62 associated with the brake pedal 61. The control device 62 supplies the braking device 63 with a pressure agent. The connectable or disconnectable viscous coupling 1 may be incorporated into the propeller shaft 57 or into the rear axle differential 58 or front axle differential 54.

Figure 4:
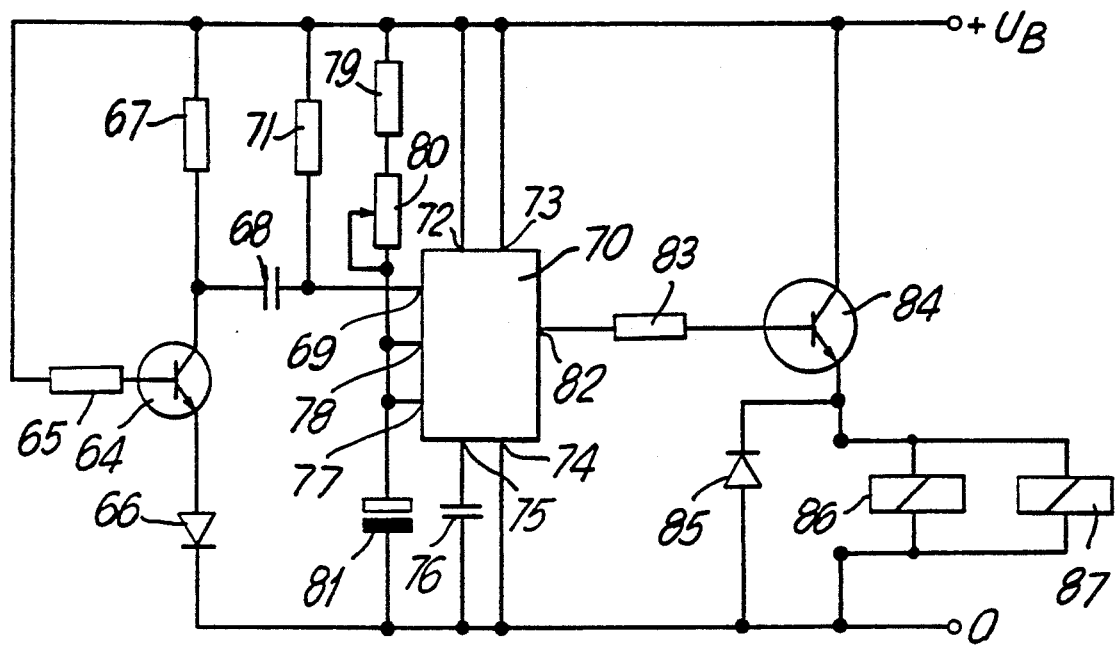
FIG. 4 shows a switching assembly for the annular magnet for switching between a connection in parallel and a connection in series.

FIG. 4 shows a switching assembly for the two windings 41, 42 which permits switching between a connection in parallel and a connection in series. Connecting the coil windings 41, 42 in parallel achieves a high attraction moment of the annular magnet 40. During the subsequent holding phase, the magnetic flow generated by the coil windings 41, 42 connected in series is sufficient for holding the setting member 36 with the ferromagnetic tongue 37 in the annular gap 39.

The switching assembly consists of an input transistor 64 whose base may be loaded with an operating voltage $U_B$ via an input resistor 65. The emitter of the input transistor 64 is connected to the zero potential of the supply voltage via a diode 66 switched in the forward direction. The collector of the input transistor, on the one hand, is connected to $U_B$ of the supply voltage via a series resistor 67 and, on the other hand, to the input 69 of the IC timer 70 and a resistor 71 via a condenser 68, with the resistor 71 being connected to $U_B$ of the supply voltage and ensuring a positive bias at the input 69 of the IC timer 70. When applying the operating voltage $+U_B$, the transistor 64 connected through immediately and via the condenser 68, passes a negative pulse to the input 69 of the IC timer 70.

The IC timer 70, via two inputs 72, 73, is also connected to $+U_B$ of the supply voltage, while being connected via a further input 74 directly and via an input 75 via a condenser 76 to the zero potential of the supply voltage. Two further inputs 77, 78 of the IC timer 70 are connected to each other and to a joint point of the RC combination 79, 80, 81, with a condenser 81 being connected to the zero potential and with the two resistors 79, 80 connected in series being connected to $+U_B$. The output 82 of the IC timer 70 is connected to the base of the output transistor 84 via a resistance 83. The collector of the output resistor 84 is positioned directly at the supply voltage $+U_B$, with the emitter being positioned at the zero potential via a diode 85 switched in the reverse direction. Two relays 86, 87 switching the coil windings 41, 42 of the annular magnet 40 are switched in parallel relative to the diode 85.

The IC timer 70, as a function of the resistors 79, 80 and the condenser 81, switches the output 82 to "high" for a specific time to be set, with the switching-in time being calculated on the basis of the set values of the RC combination 79, 80, 81. By selecting a potentiometer for the resistor 80 with a value of 50 kOhm, for example, and a condenser 81 of 10 uF, a switching-in time of 0.1 to 0.5 sec. may be set. The output transistor 84 is connected through for this predetermined time and loads the two relays 86, 87 which, in turn, connect the two coil windings 41, 42 in parallel for this predetermined time. After the set switching-in time has elapsed, the two coil windings 41, 42 are switched in series. Instead of the two relays 86, 87, it is of course also possible to use one single relay with two switching contacts. The diode 85 switched in parallel with the relays 86, 87 serves to protect the output transistor 84 from the counter induction voltage occurring during switching. The resistor 79 connected in series with the potentiometer 80 has the task of preventing a possible setting of 0 kOhm.

Figure 5:
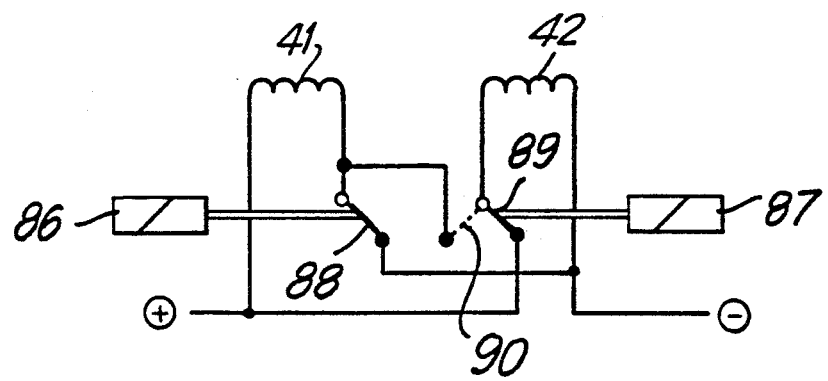
FIG. 5 shows an extension of the switching assembly according to FIG. 4, having two switching relays.

FIG. 5 shows an extension of the switching assembly incorporating two switching relays 86, 87, with the two switching relays each comprising a switching contact 88, 89 and 90. The contacts established by the two switching contacts 88, in FIG. 5 correspond to the switched-in condition of the two relays 86, 87, with the two windings 41, 42 being connected in parallel as a result. The winding 41, on the one hand, is connected to $+U_B$ of the supply voltage and, on the other hand, to a closed contact 88 of the relay 86 and a presently open contact 90 of the relay 87. Via the closed contact 88, the coil winding 41 is connected to the zero potential. The second winding 42, on the one hand, is connected directly to the zero potential and, on the other hand, to the $+U_B$ of the supply voltage via the closed contact 89. When the two relays 86, 87 are no longer loaded, the two contacts 88, 89 open and the contact 90 is closed, which leads to the two windings 41, 42 being connected in series.

While the invention has been illustrated and described as embodied in a connectable or disconnectable viscous coupling, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A switching coupling (1a) for a connectable or disconnectable viscous coupling (1b), which serves to distribute a driving torque between driving axles and/or wheels of a motor vehicle, comprising: a hollow shaft (17); a shaft journal (19) coaxially supported in the hollow shaft (17); radially movable locking elements (24) which are held in guiding apertures (22) of the hollow shaft (17) so as to be circumferentially fixed, but radially movable, and which cooperate with corresponding engaging recesses (23) in the shaft journal (19) which are axially associated with the guiding apertures (22) in the hollow shaft (17) to the shaft journal (19); a locking ring (25) which, to a limited extent, is axially movable on the hollow shaft (17) and which has a contact face for radially displacing the locking elements (24) inwardly and a blocking face for holding the locking elements (24) while simultaneously engaging the hollow shaft (17) and shaft journal (19), the locking ring (25) being axially movable between two switching positions; and a force actuated setting ring (36) arranged so as to move the locking ring (25) into one of the two switching positions against a returning force of a spring (28), the setting ring (36) having a firmly connected annular tongue (37) made of a low-remanence ferromagnetic material which may be transferred in an annular gap (39) selectively loaded with a magnetic flow and formed by a soft iron core (38), the annular gap (39) having an axial length which is at least equal to an axial distance covered by the setting member (36) between the two switching positions.

2. A drive assembly according to claim 1, and further comprising an electromagnet for producing the magnetic flow, the electromagnet being a stationary annular magnet (40), the annular magnet (4) having two magnetic windings (41, 42) with an equal number of turns and an equal wire diameter, the magnet windings (41, 42) being switchable between a parallel and a series connection by switching means.

3. A drive assembly according to claim 2, wherein the annular tongue (37) has an attraction phase in which the magnetic windings (41, 42) are switched in parallel for a maximum time of half a second, the magnetic windings (41, 42) being connected in series so as to hold the locking ring (25) against the returning force of the spring (28).

4. A drive assembly according to claim 2, wherein the locking ring (25) is directly connected to the setting ring (36) and is held,·via the spring (28), in a blocking position for the locking elements (24) on the hollow shaft (17) at an end facing away from the annular magnet (40), the locking ring (25) being transferable into a releasing position by loading of the annular magnet (40), the blocking position being securable against any vibrations by additional blocking means (33, 34).

5. A drive assembly according to claim 2, wherein the electric switching means includes an input transistor passing a negative pulse blank to an IC timer via a condenser, a time-determining R-C member associated with the IC timer and a connected power transistor for controlling at least one relay.

6. A drive assembly according to claim 1, wherein one of the switching positions is a releasing position in which the locking ring (25) is held by the returning force of the spring (28), the locking ring (25,), via an associated securing ring (43), being transferable indirectly by the setting ring (36) into a blocking position by loading an annular magnet (40), the annular magnet (40) having a first magnetic winding (41) provided with a larger wire diameter while having a smaller number of turns, and a second magnetic winding (42) provided with a smaller wire diameter while having a larger number of turns, an auxiliary spring (49) arranged so that in the blocking position only a returning force of the auxiliary spring (49) acting on the setting member (36) is decisive for the holding force of the annular magnet, the locking ring (25) being lockable via blocking means (33a, 43) including a blocking ball (33a), the locking ring (25) being transferable through axial displacement of the securing ring (43) due to the returning force of the auxiliary spring (49) so as to release the blocking ball (33a) and the returning force of the spring (28), so as to switch the locking ring (25) into the releasing position.

7. A drive assembly according to claim 6, wherein the blocking means are held in an aperture (35) of the locking ring (25) so as to correspond, radially movably, to an annular groove (36) in the hollow shaft (17), with the switching coupling (1b) being in an engaged and/or a disengaged position, the blocking means engaging an annular groove (26) in the hollow shaft (17) for axially securing the locking ring (25).

8. A drive assembly according to claim 6, wherein the blocking means includes at least one spring-loaded engaging ball (33).

9. A drive assembly according to claim 6, wherein the blocking means includes at least one blocking ball (33a) and one securing ring (43) with a cylindrical contact face (45) arranged so as to radially displace the blocking ball (33a) inwardly as well as a second cylindrical blocking face (46) arranged so as to hold the blocking ball (33a) in an annular groove (26) in the locking ring (25).

10. A drive assembly according to claim 1, wherein the switching coupling (1b) is usable together with the viscous coupling (1a) between two axles of a motor vehicle (51) so to as to load one of the two axles with a torque.

11. A drive assembly according to claim 1, wherein the switching coupling (1b) is usable together with the viscous coupling (1a) so as to effect limited locking of at least one of intermediate axle differentials and intermediate wheel differentials.

* * * * *

UNITED STATES PATENT AND TRADEMARK OFFICE
CERTIFICATE OF CORRECTION

PATENT NO. : 5,156,247

DATED : 20 October 1992

INVENTOR(S) : Helmut Wiese, et al.

It is certified that error appears in the above-identified patent and that said Letters Patent is hereby corrected as shown below:

Title page:

Item: (73) Assignee: Viscodrive GmbH, Lohmar, Federal Republic of Germany

Signed and Sealed this

Twenty-eighth Day of September, 1993

Attest:

BRUCE LEHMAN

Attesting Officer     Commissioner of Patents and Trademarks